No. 647,357. Patented Apr. 10, 1900.
F. BAKER.
NUT LOCK.
(Application filed Oct. 12, 1899.)
(No Model.)
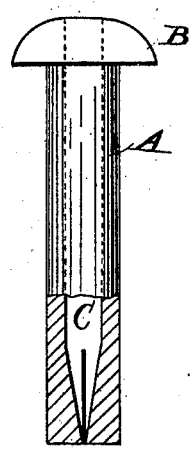
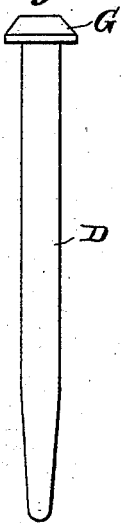
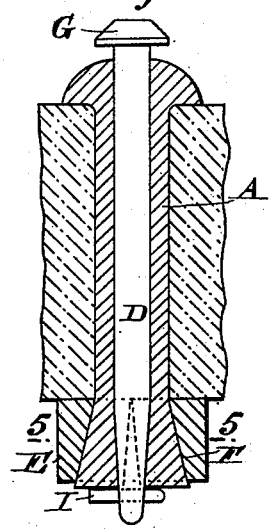
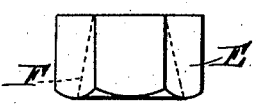
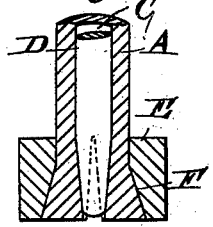
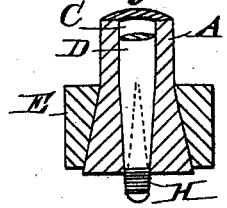
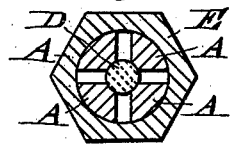
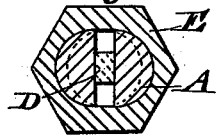
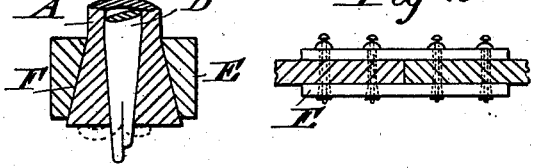

UNITED STATES PATENT OFFICE.

FREDERICK BAKER, OF CAULFIELD, VICTORIA.

NUT-LOCK.

SPECIFICATION forming part of Letters Patent No. 647,357, dated April 10, 1900.

Application filed October 12, 1899. Serial No. 733,425. (No model.)

*To all whom it may concern:*

Be it known that I, FREDERICK BAKER, builder, a subject of the Queen of Great Britain, residing at Maylands, Kambrook road, Caulfield, near Melbourne, in the British Colony of Victoria, have invented an Improved Nut-Lock Principally Adapted for Railway Purposes, (for which I applied for a patent in Victoria on the 6th day of June, 1899, and numbered 16,247,) of which the following is a specification.

This improved nut-lock has been devised mainly for use on railways for securing the ends of the rails and the fish-plates together, although it is equally applicable for many other purposes where nuts are required to be secured on bolts in such a manner that they will not be liable to work loose.

A further object of this invention is to provide a nut-lock which can be more readily and quickly fitted and secured upon a bolt than is possible with screw-threaded nuts and bolts, and at the same time my invention enables a nut to be removed and again replaced without damaging either the nut or the bolt.

In order that my invention may be clearly understood, I will describe it by reference to the accompanying drawings, in which—

Figure 1 is a sectional side elevation of a bolt adapted to be fitted with a lock-nut in accordance with this invention. Fig. 2 is a side elevation of said nut. Fig. 3 is a similar view of the locking piece or key used for expanding the lower end of the bolt, as hereinafter described. Fig. 4 is a vertical central section of the bolt and nut, while Fig. 5 is a horizontal section on line 5 5, Fig. 4; and Figs. 6 to 10 are views of various modifications.

Bolts A to be fitted with lock-nuts in accordance with this invention are constructed, as illustrated in Fig. 1, with a head B at one end in the ordinary manner; but the other end instead of being screw-threaded is split longitudinally. A hole C is formed from end to end of the bolt, and the lower end of this hole is tapering. It is adapted to receive a pin or key D, whereby the lower end of the bolt can be expanded.

The nut E is formed with a slightly-tapering hole F, the smallest diameter of which is adapted to fit over the bolt. In practice, this end of the nut is placed against the fish-plate or other article to be secured, as illustrated in Fig. 4, and the bolt A having been passed through the pin or key D is inserted and is driven into the bolt so as to expand its end into the tapering hole F in the nut. If preferred, this hole might be constructed as illustrated in Fig. 7—that is, it might be parallel for part of its length and tapering for the balance—and instead of the end of the bolt being split into four sections, as in Fig. 5, it might be split, as illustrated in Fig. 6, in one direction only.

The upper end of the pin or key D is formed with a head or shoulder G to facilitate its withdrawal from the bolt, while its lower end may be provided with means for securing it in position within the bolt. These means might consist of ratchet-teeth H, formed upon the pin or key, as illustrated in Fig. 9, to engage with the edge of the bolt, or a hole or holes might be formed through the projecting end of said pin or key, as illustrated in Fig. 4, for the reception of a split pin I. Another means for attaining the same object consists in constructing the end of the key or pin in such a way that it can be turned or bent over after it has been passed through the bolt, as illustrated in Fig. 8. This said bolt may be split either partially or from end to end and can be constructed so that it will expand all around or only on opposite sides. It can be made round, oblong, square, or any other preferred shape in cross-section, and the pin or key D used for expanding its lower end may be similarly shaped, if preferred.

The nut E can be of any preferred shape—for instance, it might be the fish-plate itself, as illustrated in Fig. 10, in which case the plate forming the nut would be formed with a number of tapering or partly-tapering and partly-parallel holes, according to the number of bolts required to be used.

Having now particularly described and ascertained the nature of my said invention and in what manner the same is to be performed, I declare that what I claim is—

1. A nut-lock comprising a hollow bolt having a longitudinally-split end opposite its head, the said end having diverging inner and outer walls, a nut having a tapering opening therethrough, and a key entering said hollow bolt at its headed end for spreading the split end of said nut in said opening.

2. A nut-lock comprising a bolt having a central bore therein and having the end thereof opposite its head longitudinally split, the walls of said bore converging adjacent to said split end, a nut having a tapering opening therethrough, and a key adapted to be inserted into the bore of said bolt at its headed end to engage the converging walls of said bore and spread the split end of said bolt in said opening.

3. A nut-lock comprising a bolt having a central bore therein and having the end thereof opposite its head longitudinally split, the walls of said bore converging adjacent to said split end, a nut having a tapering opening therethrough, a key having a tapering end adapted to be inserted into the bore in said bolt to engage the tapering walls thereof for spreading the split end of said bolt in said opening, and means for preventing the accidental removal of said key.

FREDERICK BAKER.

Witnesses:
EDWARD WATERS,
EDWARD WATERS, Jr.